(12) United States Patent
De Loye

(10) Patent No.: US 6,996,090 B1
(45) Date of Patent: Feb. 7, 2006

(54) TELEPHONE INSTALLATION, AN INTERNET SERVICE PROVIDER INSTALLATION, AND A METHOD OF USING THOSE INSTALLATIONS TO TRANSMIT TELEPHONE CALLS

(75) Inventor: Martin De Loye, Sevres (FR)

(73) Assignee: Alcatel, Paris (FR)

( * ) Notice: Subject to any disclaimer, the term of this patent is extended or adjusted under 35 U.S.C. 154(b) by 869 days.

(21) Appl. No.: 09/667,630

(22) Filed: Sep. 22, 2000

(30) Foreign Application Priority Data

Sep. 23, 1999 (FR) .................................. 99 11874

(51) Int. Cl.
   *H04L 12/66* (2006.01)
   *H04L 12/28* (2006.01)
   *H04M 1/64* (2006.01)
   *H04M 11/00* (2006.01)

(52) U.S. Cl. .................. 370/352; 370/389; 379/84; 379/90.01

(58) Field of Classification Search ................ 370/352, 370/400, 401, 353, 356, 389, 410, 493, 494; 379/93.17, 88.17, 93.24, 93.09, 84, 90.01, 379/91.02, 93.01, 93.11; 709/230, 229, 219, 709/223

See application file for complete search history.

(56) References Cited

U.S. PATENT DOCUMENTS

| | | | | |
|---|---|---|---|---|
| 5,937,041 A | * | 8/1999 | Cardillo et al. | .......... 379/93.25 |
| 6,125,177 A | * | 9/2000 | Whittaker | .................... 379/243 |
| 6,249,576 B1 | * | 6/2001 | Sassin et al. | .......... 379/218.01 |
| 6,275,490 B1 | * | 8/2001 | Mattaway et al. | .......... 370/352 |
| 6,320,857 B1 | * | 11/2001 | Tonnby et al. | .............. 370/352 |
| 6,377,570 B1 | * | 4/2002 | Vaziri et al. | ................. 370/352 |
| 6,425,000 B1 | * | 7/2002 | Carmello et al. | ........... 709/217 |
| 6,515,996 B1 | * | 2/2003 | Tonnby et al. | .............. 370/401 |
| 6,614,783 B1 | * | 9/2003 | Sonesh et al. | .............. 370/352 |
| 6,625,139 B2 | * | 9/2003 | Miloslavsky et al. | ....... 370/352 |
| 6,724,755 B1 | * | 4/2004 | Kim | .......................... 370/356 |

FOREIGN PATENT DOCUMENTS

| | | |
|---|---|---|
| EP | 0 847 183 A1 | 6/1998 |
| WO | WO 97/47118 | 12/1997 |

\* cited by examiner

*Primary Examiner*—Hanh Nguyen
(74) *Attorney, Agent, or Firm*—Sughrue Mion, PLLC

(57) ABSTRACT

A telephone installation includes an analogue telephone, an Internet connection terminal adapted to be connected to the Internet via a telephone network, and connecting means for connecting the telephone to the Internet connection terminal. The connecting means include switching circuits for connecting the telephone to the Internet connection terminal to enable the telephone to send and receive analogue format voice signals respectively to and from the telephone network. The installation also has means for receiving orders via the telephone network. The connecting means can be controlled by orders issued by a server to cause the telephone to be connected to the terminal.

11 Claims, 1 Drawing Sheet

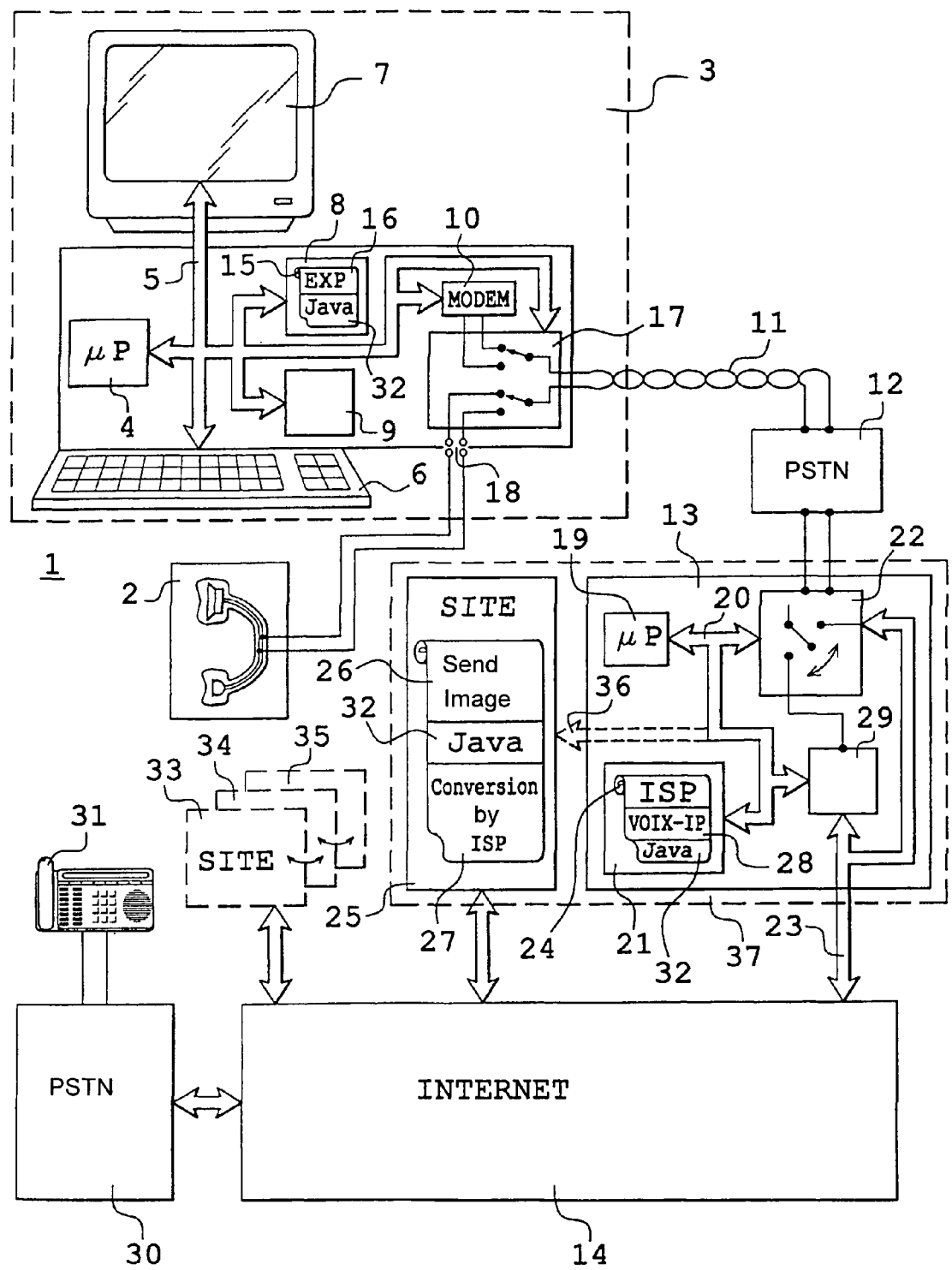

TELEPHONE INSTALLATION, AN INTERNET SERVICE PROVIDER INSTALLATION, AND A METHOD OF USING THOSE INSTALLATIONS TO TRANSMIT TELEPHONE CALLS

The present invention relates to a telephone installation, to an Internet service provider installation, and to a method of using those installations to transmit telephone calls. Its object is to increase the range of services offered via the Internet and generally to increase transmission possibilities.

BACKGROUND OF THE INVENTION

In standard telephony, voice signals exchanged between parties modulate an electrical signal in base band which is transmitted by two-wire lines, often twisted pairs. Coding and modulation processes have enabled the same transmission principles to be used to transmit digital data. In this case, the digital data to be transmitted is modulated at the transmitter and demodulated at the receiver by modems in order to be transmitted via the same paths as the voice signal. Consequently, these signals modulated in this way will be referred to as signals modulated in a natural analogue manner. Natural analogue signals are distinguished from digital signals. Digital signals, typically binary signals for modulation in base band, require prior coding.

Also, to send voice signals via a digital channel, vocoders convert natural analogue signals into streams of bits timed at a standardized rate. Such conversions are encountered in particular in mobile telephony, in which all processing is digital, including modulation and radio transmission.

In the context of the Internet, the signals exchanged between terminals and Internet sites visited by users of the terminals are digital signals formatted in accordance with a particular protocol which is specific to the Internet and is known as the Internet Protocol (IP). An Internet connection terminal therefore includes appropriate converter circuits.

Initially, Internet connections entailed only visiting sites, in accordance with the following principles. Using an Internet terminal, a user enters a site address. This process is often greatly simplified and amounts to no more than double-clicking the mouse on an icon on the screen of the terminal. The microprocessor of the terminal then finds the address of the site corresponding to the icon in a memory of the terminal, constructs a message conforming to the IP using that address, and transmits the message to circuits of a service provider via a modem.

The service provider circuits transmit a request to the site designated by the address message. The designated site receives the request and sends a file representing a page to the terminal. Sending to the terminal is relatively easy because, in the IP format, the address of the user terminal is transmitted at the same time as the address designating the target site.

This basic, but already particularly interesting, facility has now had telephone call services added to it. The document WO 97/47118 describes a system for telephone communication during an Internet session: the user terminals are personal computers, each of which has a loudspeaker and a microphone connected to a sound card. The sound card includes:

a digitizing and compression system for converting voice signals from the microphone into digital signals, and a digital-to-analogue converter and decompression system for converting digital voice signals into analogue signals that can be fed to the loudspeaker.

The processor carries out a formatting operation to construct IP packets from the digital signals from the sound card. A modem transmits the digitized voice signals formatted to the IP format over a standard analogue telephone line. Outside Internet sessions, the telephone line can be used by a standard telephone. However, the telephone cannot be used during an Internet session because the line is busied by the modem.

To start an Internet session, the terminal sets up a call to the circuits of an Internet service provider, which allocate an Internet address to the terminal.

In the event of an outgoing telephone call from the Internet terminal, a telephony application is executed in the terminal. The user enters the number of the called party. The IP packets are received by the circuits of the Internet service provider and are then forwarded to a telephony server which sets up a telephone call to the called party line:

If the called party is a standard telephone, the call set up between it and the server is a standard telephone call. The server sends decompressed analogue voice signals.

If the called party has a personal computer with a sound card, a microphone and a loudspeaker, and is running a telephony application using the same server, the server alerts the called party by means of an IP packet. If the called party decides to take the call, the server sends them the voice signals in compressed digital form in IP packets.

In the case of an outgoing telephone call from a standard telephone to a called party using an Internet terminal, if the Internet terminal is in use and a telephony application is running on it, the calling party enters the number corresponding to the line to which the Internet terminal is connected. However, the telephone network forwards the call to the telephony server, which knows that the called telephone number corresponds to an IP address for setting up a telephone connection using the Internet protocol. It sends the called party an alert message in the form of an IP packet. If the called party decides to take the call, the server digitizes the voice signals from the calling party, compresses them, and assembles them into IP packets. The IP packets are sent to the Internet service provider and are then forwarded to the Internet terminal of the called party.

Compared to the standard methods, the above method of routing telephone calls has the advantage of using a single infrastructure, that of the Internet, to transmit data and voice at the same time.

However, the method has the disadvantage that the Internet terminal must be fitted with an additional circuit card for digitizing and compressing voice signals, and for the converse operations, and enabling connection of a loudspeaker and a microphone or a telephone. If the Internet connection terminal is an IBM-compatible personal computer, it can be fitted with a sound card enabling it to perform digitization and compression and to enable the connection of a telephone or a loudspeaker and a microphone. This represents an additional cost. Also, installing a sound card is not possible in some Internet terminals.

OBJECTS AND SUMMARY OF THE INVENTION

An object of the present invention is therefore to avoid the additional cost and complication of installing a sound card.

The invention provides a telephone installation including: an analogue telephone, an Internet connection terminal adapted to be connected to the Internet via a telephone network, and means for connecting said telephone to said Internet connection terminal, wherein the connecting means include switching circuits for connecting the telephone to the Internet connection terminal to enable said telephone to send and receive analogue format voice signals respectively to and from the telephone network.

In a first embodiment, the switching circuits are controlled manually. To telephone, the user connects the Internet terminal to the Internet and designates a specific site. That site is a server which sends a page to the terminal to prompt the user to operate the switching circuits of the Internet terminal manually to connect the analogue telephone to the Internet terminal to enable the telephone to access the analogue line, i.e. to send and receive analogue voice signals, respectively to and from the telephone network. The telephone is therefore connected to the service provider via the analogue connection, despite the fact that an Internet session has begun. The server also sends an instruction to the service provider to perform the analogue-to-digital conversion, compression, and IP format packet assembly operations. The voice signals are then routed via the Internet. This is known in the art.

In a second embodiment, the installation further includes means for receiving instructions via the telephone network and the switching circuits can be controlled by the means for receiving instructions sent by the server and commanding said switching circuits to connect the telephone to the terminal.

To telephone, the user connects the Internet terminal to the Internet network and designates a specific site. That site is a server which then issues an instruction to the switching circuits of the Internet terminal to connect the analogue telephone to the Internet terminal to enable the telephone to access the analogue line, i.e. to send and receive analogue voice signals, respectively to and from the telephone network. The telephone is therefore connected to the circuits of the service provider via the analogue connection, even though an Internet session has begun. The server further sends an instruction to the service provider to perform the analogue-to-digital conversion, compression and IP format packet assembly operations. The voice signals are then routed via the Internet. This is known in the art.

The invention further provides an Internet service provider installation, including:
  connecting circuits for connecting it to a telephone network and to the Internet, and
  circuits for converting analogue format voice signals into digital format signals acceptable to the Internet,
  wherein the installation includes means for sending switching instructions to a telephone installation including an analogue telephone, an Internet connection terminal connected to the telephone network, and switching circuits for connecting the telephone to the terminal, said instructions commanding said switching circuits to connect the telephone to the Internet connection terminal to enable said telephone to send and receive analogue format voice signals respectively to and from the telephone network.

It finally provides a method of routing telephone calls to or from a telephone installation including an analogue telephone, an Internet connection terminal connected to a telephone network, and switching circuits for connecting the telephone to the terminal, wherein a connection is first set up between the terminal and the Internet via circuits of a service provider,
  wherein, to connect said telephone to the service provider circuits, switching instructions are sent from a server via the circuits of an Internet service provider, said instructions commanding the switching circuits to connect the telephone to the terminal to enable said telephone to send and receive analogue format voice signals respectively to and from the telephone network.

BRIEF DESCRIPTION OF THE DRAWING

The invention will be better understood on reading the following description. The single FIGURE shows a telephone installation, an Internet service provider installation, and means for implementing the call routing method according to the invention.

MORE DETAILED DESCRIPTION

The telephone installation 1 includes a telephone 2 and an Internet connection terminal 3. To provide the Internet connection, the terminal 3 includes, in the case of a personal microcomputer, as in the example shown here, a microprocessor 4 connected by a data, address, and command bus 5 to a keyboard 6 (including a trackball, mouse or other pointing device, not shown), a screen 7, a program memory 8, and a data memory 9. For the Internet connection the terminal also includes a modem 10 connected to the bus 5 and to a telephone line 11 for connecting it to circuits 13 of an Internet service provider 14, usually via the public switched telephone network (PSTN) 12. The memory 8 contains a program 15 essentially provided with an operating system 16. This is known in the art. The system 16 can be dedicated to using the terminal 3 to communicate with the Internet 14.

The telephone installation 1 is particularly characterized by circuits 17, shown diagrammatically here, for sending voice signals in a natural analogue format over the link 11 between the terminal and the Internet 14. The circuits 17 are shown here as a switch for connecting an output port of the modem 10 and/or the telephone 2 to the line 11 on demand. The circuits 17 are preferably automatic circuits controlled by the microprocessor 4, from which they receive switching instructions via the bus 5. However, it would be feasible for the switch 17 to be a manually operated mechanical switch, for example a switch operated by plugging a jack of the telephone 2 into a port 18 of the terminal 1.

To accommodate operation in accordance with the invention, the service provider circuits 13 conventionally include a microprocessor 19 providing an arithmetic and logic unit and connected by a bus 20 to a program memory 21 and connection circuits 22. In practice the connection circuits 22 connect the line 11 to the Internet 14. Here the connection circuits 22 are symbolized by a switch. In practice the circuits 22 include circuits for receiving IP format packets transmitted via the line 11 and circuits for injecting the packets with the appropriate synchronization and bit rate into a link 23 connecting the circuits 13 to the Internet 14. To this end, the microprocessor 19 uses an Internet service provider (ISP) program 24. This is known in the art.

In accordance with the invention, the call set up by the terminal 3 includes from the outset the designation of a specific site 25, for example a site connected to the Internet 14. This designation can be modified (see below). Normally a site 25 can do only one thing. It can only send, by means of a program 26, an image corresponding to the address of the site 25. In accordance with the invention, in addition to or instead of sending an image (which is not even necessary, but which may be preferred), the site 25 causes a program 27 to switch the circuits 17 and the service provider circuits 13 to convert received voice signals into Internet protocol signals.

With this latter aim in view, the program memory 21 includes a sub-routine VOIX-IP 28 of the program 24 for voice coding and IP formatting the received signals. The program 28 also switches the circuits 22 so that the signals received from the line 11 are not transmitted as such to the Internet 14 but are transmitted to processing, coding and IP formatting circuits 29. The circuits 29 can in practice be coprocessors of the processor 19. In this case, the signals placed on the link 23 connecting the circuits 13 to the Internet 14 are the signals from the coprocessor 29. Under these conditions, the voice signals are transmitted to the Internet 14 with the appropriate coding. At another end, circuits of a type known in the art connect the telephone 2 to another telephone 31, in particular via a switched telephone network 30.

The switching circuits 17 are preferably triggered automatically, and must be triggered by a trigger instruction from the circuit 13 (or the site 25) addressed to the terminal 3. The instruction can be produced directly by the microprocessor 4 after receiving an acknowledgment signal ACK from the circuit 13 indicating that the request designating the specific site 25 has been understood. In this case, the acknowledgment is equivalent to the triggering instruction. In practice circuits like the circuits 17 exist already in all compatible microcomputers. For them to be switched by the triggering instruction or the acknowledgment, the program 15 must include an additional sub-routine which represents the invention and is not provided as standard. The invention therefore provides for transmitting a program 32 of this kind at least once from the site 26 where it is stored to the terminal 3, so that the microprocessor 4 can store it in the memory 8. To this end, the automatic switching program 32 is written in JAVA. In accordance with a specific feature of that language, all microcomputers now include an interpreter or compiler for converting a program written in JAVA into a program that can be executed by the microcomputer. Thus JAVA is a universal programming language understandable by everybody. It is therefore certain that the program 32 can at least be interpreted by the terminal 3. The result of the interpretation may be transient, in which case the program 32 must be sent again and/or interpreted each time a call is set up. The program 32 is preferably stored and then compiled by the microprocessor 4 and stored in the memory 8 in executable form. However, downloading the program 32 via the Internet ensures that the terminal will always have the latest and best version of the program 32. The sending of the program 32 is referred to in the standard terminology as a JAVA applet, because it is downloaded.

The circuits 17 can be provided as standard in the circuits of the terminal 1 or in the circuits of the modem 10 or in the circuits of the telephone 2.

Many sites 33 connected to the Internet are accessible, such as the site 25. Some sites 33 comprise several pages linked by hypertext links transmitted with the files representing the images to be displayed on the screen 7. For example, the site 25 could be a site connected to the Internet, like the site 33. It is nevertheless possible for the program 28 to be able to detect a request addressed to a non-existent site 25 and to have the function of the site 25 executed by internal circuits of the circuit 13, without going via the Internet 14. In practice this can be achieved by providing the circuits 13 available at a service provider with a program memory corresponding to the site 25 and an additional connection 36 from the bus 20 to form general circuits 37 and means for detecting the specific request. The solution with a real site 25 may nevertheless be preferred because it enables access from many places within a territory.

The method according to the invention operates in the following manner. If the user of the installation wishes to use their terminal 3 to telephone via the Internet, they plug the jack of their telephone 2 into the socket 18, unless the telephone 2 is permanently connected to the terminal 1. They then enter via the keyboard 6 a request for connection (via the modem 10) to a specific site 25 known in advance. The site can be shown on the screen 7 by a browser, in the form of an icon, for example, which causes execution of a program for setting up a telephone call on the line 11 and transmitting a corresponding address to the site 25. The circuits 13 transmit a request to the address of the site via the Internet. The site 25 responds by sending, via the program, an image, which can indicate in substance a message of the type "You are connected", and an instruction addressed to the circuits 13 in order to cause the instruction sent to the terminal 3 to switch the circuits 17 to connect the telephone 2 to the line 11. The microprocessor 19 must switch the circuit 22 so that the signals transmitted via the line 11, which are no longer IP signals, are no longer sent as such on the bus 23 but are processed beforehand by the coprocessor 29. The program 28 causes the coprocessor 29 to process the voice signals to format them to the IP format. The coprocessor 29 therefore transmits voice signals formatted to the IP format to the Internet 14. The coprocessor 29 is of course capable of performing the converse operations, i.e. of receiving IP format signals and converting them into natural analogue signals that can be transmitted over the line 11 and via the PSTN 12 to the telephone 2. When the connection to the site 25 is set up, the program 32 first verifies that the terminal 3 has the sub-routine 32 enabling the microprocessor 4 to operate the switch 17. If not, the program 32 is sent so that it can be executed first.

What is claimed is:

1. A telephone installation comprising:
    an analogue telephone,
    an Internet connection terminal adapted to be connected to the Internet via a telephone network,
    connecting means for connecting said telephone to said Internet connection terminal,
    wherein the connecting means include switching circuits for connecting the telephone to the Internet connection terminal in accordance with switching instructions from an Internet server to enable said telephone to send and receive analogue format voice signals respectively to and from the telephone network, and
    means for receiving the switching instructions via the telephone network and wherein the switching circuits are adapted to be controlled by the means for receiving the switching instructions, said switching instructions commanding said switching circuit to connect the telephone to the Internet connection terminal.

2. The telephone installation according to claim 1, wherein the switching circuits are manually controlled.

3. An Internet service provider installation, including:
    connecting circuits for connecting the Internet service provider to a telephone network and to the Internet; and
    circuits for converting analogue format voice signals into digital format signals acceptable to the Internet,
    wherein the Internet service provider installation includes means for sending switching instructions to a telephone installation including an analogue telephone, an Internet connection terminal connected to the telephone network, and switching circuits for connecting the telephone to the Internet connection terminal, said switching instructions commanding said switching circuits to connect the telephone to the Internet connection terminal to enable said telephone to send and receive analogue format voice signals respectively to and from the telephone network.

4. The Internet service provider installation according to claim 3, further including means for sending a switching program to be executed by the means in order to receive the switching instructions in the Internet connection terminal of the telephone installation.

5. The Internet service provider installation according to claim 4, wherein the switching program is written in JAVA.

6. A server adapted to be connected to the Internet, wherein the server includes means for sending switching instructions to a telephone installation including an analogue telephone, an Internet connection terminal connected to a telephone network, and switching circuits for connecting the telephone to the terminal, said switching instructions commanding said switching circuit to connect the telephone to the Internet connection terminal to enable said telephone to send and receive analogue format voice signals respectively to and from the telephone network.

7. The server according to claim 6, further including means for sending a switching program to be executed in the means for receiving the switching instructions in the Internet connection terminal of the telephone installation.

8. The server according to claim 6, wherein the switching program is written in JAVA.

9. A method of routing telephone calls to or from a telephone installation including an analogue telephone, an Internet connection terminal connected to a telephone network, and switching circuits for connecting the telephone to the Internet connection terminal, in which method a connection is first set up between the Internet connection terminal and the Internet via circuits of an Internet service provider, wherein, to connect said telephone to the circuits of the Internet service provider, switching instructions are sent from a server via the circuits of the Internet service provider, said switching instructions commanding the switching circuits to connect the telephone to the Internet connection terminal to enable said telephone to send and receive analogue format voice signals respectively to and from the telephone network.

10. The method according to claim 9, wherein the switching instructions are sent from a server integrated into the circuits of the Internet service provider.

11. The method according to claim 9, wherein a switching program to be executed in the Internet connection terminal is downloaded from an Internet site or from the circuits of the Internet service provider.

* * * * *